Figure 1:
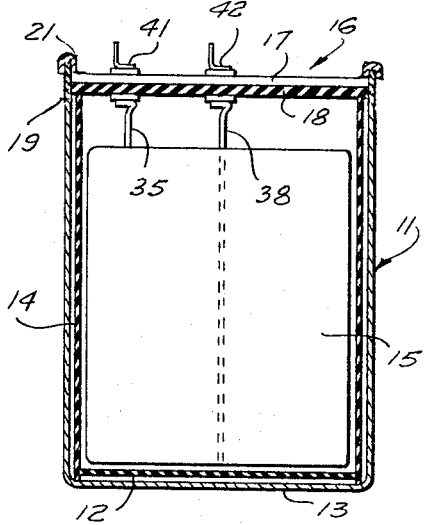

Nov. 1, 1966  A. G. KALSTEIN  3,283,225

ELECTRIC CAPACITOR

Filed April 27, 1965

INVENTOR
ABRAHAM G. KALSTEIN
BY
Dean, Fairbank & Hirsch
ATTORNEYS

3,283,225
ELECTRIC CAPACITOR
Abraham G. Kalstein, New Bedford, Mass., assignor to Aerovox Corporation, New Bedford, Mass., a corporation of Massachusetts
Filed Apr. 27, 1965, Ser. No. 451,261
4 Claims. (Cl. 317—247)

This invention relates to the art of electric capacitors and more particularly to an electric capacitor of the wound type formed from elongated strips of foil electrodes and paper spacers having internal protective means to open the electric circuit thereto upon excessive temperature rise to prevent rupture of the capacitor container.

As conducive to an understanding of the invention, it is noted that where a heat responsive element is provided in an electric capacitor to melt and to break the electric circuit when the temperature exceeds a predetermined amount and such element is wound into the capaictor section with one end of the element connected to the terminal tab of the capaictor and the other end to one of the electrodes internally of the capacitor section, although the element may melt to break the circuit when the internal temperature exceeded a predetermined amount, in the event there should be an external temperature rise, the internal element might not reach its melting temperature until the external temperature had risen past a critical point with resultant generation of gases in the sealed container and possibility of rupture of such container.

Where the heat responsive element is wound into the capacitor section it must necessarily be sufficiently thin to permit such winding. Where a mixture of bismuth, tin and lead is used for the element, in order to permit rolling of the mixture to a sufficiently thin degree so that the resultant element would not be too brittle, the percentage of tin would have to be relatively large. Accordingly, such element would have a higher melting point than a corresponding element having a lower percentage of tin.

Where the element is wound into the capacitor winding and only a few layers of insulating paper intervene between the element and the adjacent foil electrode, if any arcing should occur between the element and the adjacent electrode before the temperature had risen sufficiently to cause melting of the element, the charring or burning through of the relatively few layers of insulating paper could permit contact of a portion of the heat responsive element with the adjacent electrode, thereby maintaining the electrical circuit with resultant further increase in temperature and possible rupture of the capacitor, even though the heat responsive element had melted.

It is accordingly among the objects of the invention to provide an electric capacitor of the wound type formed from elongated strips of foil electrodes and paper spacers, which capacitor is provided with protective means that will dependably open the electric circuit to the capacitor with excessive temperature increases both internally and externally and which may readily be assembled at relatively low cost.

According to the invention these objects are accomplished by the arrangement and combination of elements hereinafter described and more particularly recited in the claims.

Figure 2:
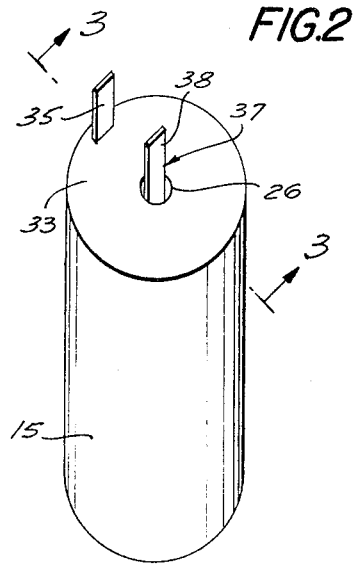
Figure 3:
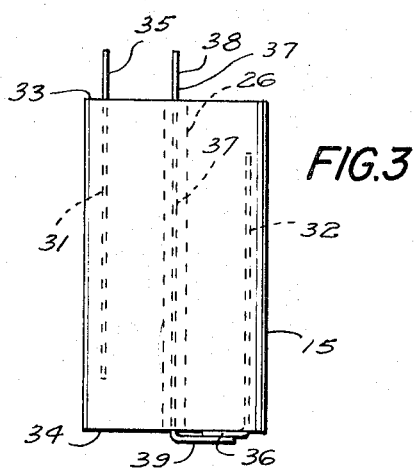
Figure 4:
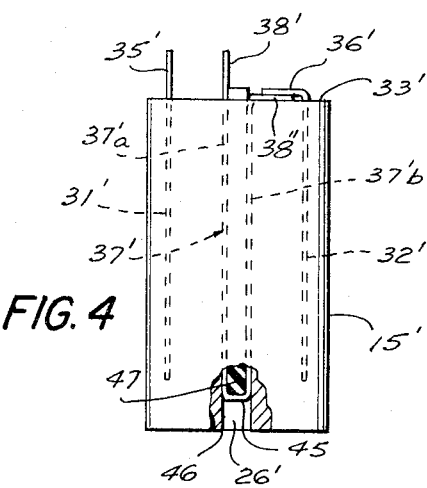
Figure 5:
Figure 6:
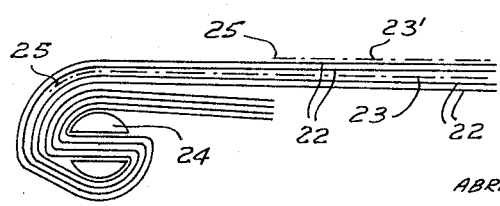

In the accompanying drawings in which are shown one or more of various possible embodiments of the several features of the invention, FIG. 1 is a longitudinal sectional view of an electric capacitor assembly according to the invention, FIG. 2 is a perspective view of the capacitor section of the capacitor assembly of FIG. 1, FIG. 3 is a sectional view taken along line 3—3 of FIG. 2, FIG. 4 is a longitudinal sectional view of a capacitor section according to another embodiment of the invention, FIG. 5 is a diagrammatic view illustrating the method of winding the capacitor sections of the present invention, and FIG. 6 is a view similar to FIG. 5 showing the capacitor section at the start of its winding.

Referring now to the drawings, as shown in FIGS. 1 to 3, the capacitor assembly comprises a container 11, illustratively a metal can as shown. The container has an insulating disc 12 on its floor 13 and an insulating liner 14 positioned adjacent the wall of the container and extending substantially the length thereof.

A capacitor section 15 of the conventionally wound type is positioned in the container and the mouth of the container is sealed by a cover assembly 16 which illustratively comprises a cover disc 17 having an insulating disc 18 on its undersurface, the assembly being secured in conventional manner to the rim 19 of the container by being clamped thereto at its periphery as at 21.

The capacitor section 15 is wound as shown in FIG. 5, by positioning the ends of a plurality of spacer strips of paper 22 between the foil strip electrodes 23, 23' in a split arbor 24 so that such ends or tails extend beyond the arbor 24.

As illustratively shown, a pair of paper strips 22 straddle each of the foil strip electrodes 23, 23' of the capacitor and these are narrower in width than the paper strips 22. The ends 25 of the foil strip electrodes 23, 23' are spaced from the arbor 24. As a result, when the capacitor section is wound to define a cylinder and the arbor 24 is removed, as shown in FIG. 2, there will be left an axial opening 26 through the section and the wall of the opening 26 will comprise at least ten layers of the paper spacer 22 before the electrodes 23 or 23' as is shown in FIG. 6.

The capacitor section during winding has terminal strips 31, 32 connected to the foil strips 23, 23' in conventional manner well known in the art and in the embodiment shown in FIGS. 1 to 3 for example, the strips 31, 32 protrude respectively beyond the ends 33, 34 of the wound section as at 35, 36.

According to the invention, an elongated metal strip 37 of suitable material that will melt at a predetermined temperature and of length greater than that of the capacitor section, is inserted through the opening 26 of the wound section 15 so that the ends 38, 39 of the strip 37 protrude beyond the ends 33, 34 of the capacitor. Thereupon, the ends 36 and 39 of the strips 32 and 37 are bent toward each other and secured together as by welding or soldering to make a dependable electrical connection.

At this time the capacitor sections 15 may be compressed slightly so as to flatten it out, to facilitate its insertion into container 11 which may be rectangular in cross section.

The ends 35 and 38 of the strips 31 and 37 are then electrically connected as by welding to the lower ends of terminal studs 41, 42 secured to the cover assembly 16, and the capacitor section and cover assembly are then positioned in the container 11 and the cover assembly secured in position.

The capacitor assembly is treated in conventional manner well known in the art and charged with a suitable dielectric liquid to complete the unit.

Although the strip 37 could be of any suitable material, in the embodiment herein shown in which it has a melting point of approximately 145 degrees centigrade, it illustratively is an alloy of 50 percent lead, 25 percent tin and 25 percent bismuth and is ¼ inch wide and .003 inch thick.

It is of course to be understood that various other alloys, including cadmium, indium and cobalt could be used and the dimensions changed depending upon the melting point desired.

The embodiment shown in FIG. 4 is similar in many respects to the embodiment shown in FIGS. 1 to 3 and corresponding parts have the same reference numerals primed.

In the embodiment shown in FIG. 4, the terminal strips 31', 32' both protrude beyond the same end 33' of the capacitor section as at 35', 36'. The strip 37' which is positioned in the opening 26' of capacitor section 15' is reversely bent as at 45 and such reversely bent end does not extend through the adjacent end 46 of bore 26'.

The ends 38', 38'' of the legs 38'a, 37'b of strip 37' protrude beyond the end 33' of the capacitor section 15' and a strip 47 of insulating material is positioned in the opening 26' between said legs 37'a, 37'b.

The protruding ends 36' and 38'' of the strip 32' and leg 37'b are bent toward each other and electrically connected as by welding. The capacitor section shown in FIG. 4 is then connected to a cover assembly similar to cover assembly 16 and the unit is completed as described with respect to the embodiment of FIGS. 1 to 3.

With the constructions above described, it is apparent that since the point of highest temperature in a capacitor during normal operation is in the center of the capacitor, since the heat responsive strip 37 is located in the opening 26 at such capacitor center, as soon as the temperature rises to a critical value, the strip 37 will melt and break the circuit.

Since the strip 37 is not wound into the capacitor section it can be of greater thickness with a lower proportion of tin. Hence, its melting temperature can be relatively low and preferably is just slightly above the temperature at which the capacitor section is impregnated.

Inasmuch as the wall of the opening 26 is formed by at least ten layers of paper 22, even if any arcing should occur between the electrodes 23, 23', there is sufficient paper available to prevent break through to the strip 37 due to charring or burning of the paper, thereby preventing undesired continuity of the electrical circuit after melting of strip 37, by reason of the contact of strip 37 with the foil electrodes.

Furthermore, since the strip 37 extending through the opening 26 is not in the strongest portion of the electric field of the capacitor, the voltage charge on the paper defining the wall of opening 26 is relatively low and hence there is little stress on such paper. As a result, the likelihood of charring or burning of such paper defining the wall of opening 26 is not likely.

The capacitor according to the invention also is protected in the event of external temperature rises. Thus, the protruding ends 38, 39 of the strip 37 will melt or rupture to break the circuit when the external temperature rises above a predetermined amount and such temperature can be the same as that which will cause the strip 37 to melt in the opening 26.

The heat responsive strip 37 in addition to providing protection against internal and external temperature rises, will also protect the capacitor against rupture in the event of an extreme current increase which causes the strip to overheat and exceed its melting point.

As the heat responsive strip, according to the invention, may be inserted into the capacitor section either during or after winding thereof, it facilitates assembly of the unit.

Although in the illustrative embodiment of the invention herein described, the dielectric between the foil electrodes is a paper spacer in the form of an elongated strip, it is to be understood that instead of using a spacer of paper strip, the spacer could be of plastic film and furthermore, the spacer and electrode could be combined by using a metalized plastic film of metalized paper.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An electric capacitor comprising a plurality of elongated strips of conducting material and dielectric material alternately disposed and wound into a roll having an axial opening each of said strips of conducting material being inwardly spaced from the free end of the strips of dielectric material at the axis of the roll, whereby when the roll is wound with the winding arbor spaced from the ends of the conducting strips by a distance several times the diameter of the arbor, a plurality of layers of dielectric material will be defined between the axial opening and the next adjacent strip of conducting material, a pair of terminal strips secured respectively to at least two of the strips of conducting material and protruding beyond the capacitor, the protruding end of one of said terminal strips defining a connecting portion and a strip of heat responsive material positioned in said axial opening, one end of said strip of heat responsive material being electrically connected to the protruding end of the other of said terminal strips and the other end of said heat responsive strip defining a second connecting portion.

2. The capacitor set forth in claim 1 in which both of said terminal strips protrude beyond the same end of said capacitor.

3. The capacitor set forth in claim 1 in which the terminal strips protrude respectively beyond opposite ends of said capacitor, said heat responsive strip protrudes beyond both ends of said capacitor, the protruding end of the other of said terminal strips and the first named end of said heat responsive strip being electrically connected.

4. The capacitor set forth in claim 1 in which the terminal strips protrude respectively beyond the same end of said capacitor, said heat responsive strip positioned in said axial opening is reversely bent defining a pair of spaced legs, the ends of said legs protruding beyond the same end of said capacitor as said terminal strips, an insulating strip in said bore between the legs of said heat responsive strips, the protruding end of the other of said terminal strips and one of the protruding legs of said heat responsive strip being electrically connected.

References Cited by the Examiner

UNITED STATES PATENTS

| | | | |
|---|---|---|---|
| 3,178,622 | 4/1965 | Paul | 317—247 X |
| 3,206,661 | 9/1965 | Blank | 317—260 |

OTHER REFERENCES

The Condensed Chemical Dictionary, 6th edition, New York, Reinhold, 1962, pp. 522–523.

Dummer et al.: Fixed and Variable Capacitors, McGraw-Hill, New York, 1960, pp. 96, 97, 145 and 146.

LEWIS H. MYERS, *Primary Examiner.*

LARAMIE E. ASKIN, *Examiner.*

E. GOLDBERG, *Assistant Examiner.*

Notice of Adverse Decision in Interference

In Interference No. 95,850, involving Patent No. 3,283,225, A. G. Kalstein, ELECTRIC CAPACITOR, final judgment adverse to the patentee was rendered Aug. 28, 1967, as to claim 1.

[*Official Gazette October 24, 1967.*]